United States Patent
Ji et al.

(10) Patent No.: US 12,526,744 B2
(45) Date of Patent: Jan. 13, 2026

(54) FEEDBACK SIGNAL DETECTION FOR SIDELINK DISCONTINUOUS RECEPTION

(71) Applicant: NOKIA TECHNOLOGIES OY, Espoo (FI)

(72) Inventors: Lianghai Ji, Aalborg (DK); Nuno Manuel Kiilerich Pratas, Gistrup (DK); Faranaz Sabouri-Sichani, Aalborg (DK); Berthold Panzner, Holzkirchen (DE); Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 329 days.

(21) Appl. No.: 18/261,249

(22) PCT Filed: Dec. 22, 2021

(86) PCT No.: PCT/FI2021/050908
§ 371 (c)(1),
(2) Date: Jul. 12, 2023

(87) PCT Pub. No.: WO2022/152966
PCT Pub. Date: Jul. 21, 2022

(65) Prior Publication Data
US 2024/0080768 A1 Mar. 7, 2024

(30) Foreign Application Priority Data
Jan. 13, 2021 (FI) .................................. 20215032

(51) Int. Cl.
*H04W 76/23* (2018.01)
*H04L 1/1867* (2023.01)
(Continued)

(52) U.S. Cl.
CPC ....... *H04W 52/0229* (2013.01); *H04L 5/0053* (2013.01); *H04W 72/02* (2013.01); *H04W 72/20* (2023.01)

(58) Field of Classification Search
CPC ............. H04W 52/0229; H04W 72/02; H04W 52/0216; H04W 76/14; H04W 92/18; H04W 76/23; H04W 72/044; H04L 1/188
See application file for complete search history.

(56) References Cited

U.S. PATENT DOCUMENTS 11,252,753 B2 * 2/2022 Chen .................... H04W 72/23
2019/0363843 A1 11/2019 Gordaychik
(Continued)

FOREIGN PATENT DOCUMENTS

| CN | 111556590 A | 8/2020 |
| EP | 3996426 A1 | 5/2022 |

(Continued)

OTHER PUBLICATIONS

3GPP TSG RAN WG1 Meeting#95, R1-1814276 Title:Correction on resource exclusion procedure for V2X Phase 2 (Year: 2018).*
(Continued)

*Primary Examiner* — Faruk Hamza
*Assistant Examiner* — Abusayeed M Haque
(74) *Attorney, Agent, or Firm* — Lippes Mathias LLP

(57) ABSTRACT

Disclosed is a method comprising receiving a first transmission from a first terminal device, wherein the first transmission indicates one or more resources to be used at least for a second transmission, monitoring one or more physical feedback channel resources associated with the indicated one or more resources, detecting one or more feedback signals from the monitored one or more physical feedback channel resources, and extending a wake-up time based at least partly on the detected one or more feedback signals.

16 Claims, 9 Drawing Sheets

(51) Int. Cl.
　　*H04L 5/00*　　　(2006.01)
　　*H04W 52/02*　　(2009.01)
　　*H04W 72/02*　　(2009.01)
　　*H04W 72/20*　　(2023.01)
　　*H04W 76/14*　　(2018.01)
　　*H04W 76/28*　　(2018.01)

(56) References Cited

U.S. PATENT DOCUMENTS

| | | | |
|---|---|---|---|
| 2020/0092805 A1 | 3/2020 | Zhang et al. | |
| 2020/0275474 A1* | 8/2020 | Chen | H04L 1/1607 |
| 2020/0314940 A1 | 10/2020 | Park et al. | |
| 2020/0344722 A1 | 10/2020 | He et al. | |
| 2021/0058833 A1* | 2/2021 | Basu Mallick | H04L 69/321 |
| 2021/0084586 A1* | 3/2021 | Loehr | H04W 76/28 |
| 2022/0150730 A1* | 5/2022 | Freda | H04L 1/188 |
| 2022/0174646 A1 | 6/2022 | Lee et al. | |
| 2022/0248425 A1 | 8/2022 | Lee et al. | |
| 2022/0369417 A1 | 11/2022 | Park et al. | |

FOREIGN PATENT DOCUMENTS

| | | |
|---|---|---|
| WO | WO 2020/146580 A1 | 7/2020 |
| WO | WO 2020/167773 A1 | 8/2020 |
| WO | WO 2020/198586 A1 | 10/2020 |
| WO | WO 2020/209603 A1 | 10/2020 |
| WO | WO 2020/222514 A1 | 11/2020 |
| WO | WO 2021/002723 A1 | 1/2021 |

OTHER PUBLICATIONS

3GPP TSG-RAN WG1 Meeting#99, R2-1709362 Title: Handling Non-Overlapping Transmission Parameter Connfiguration (Year: 2017).*

"3rd Generation Partnership Project; Technical Specification Group Radio Access Network; NR; Medium Access Control (MAC) protocol specification (Release 16)", 3GPP TS 38.321 v16.3.0, (Dec. 2020), 156 pages.

"3rd Generation Partnership Project; Technical Specification Group Radio Access Network; NR; Multiplexing and channel coding (Release 16)", 3GPP TS 38.212 v16.3.0, (Sep. 2020), 152 pages.

"3rd Generation Partnership Project; Technical Specification Group Radio Access Network; NR; Physical layer procedures for control (Release 16)", 3GPP TS 38.213 v16.4.0, (Dec. 2020), 181 pages.

Extended European Search Report for European Application No. 21919208.5 dated Feb. 28, 2024, 13 pages.

Huawei et al., "Consideration on the sidelink DRX for unicast, groupcast and broadcast", 3GPP TSG-RAN WG2 Meeting #112 electronic, R2-2009413, (Nov. 2-13, 2020), 8 pages.

International Search Report and Written Opinion for Patent Cooperation Treaty Application No. PCT/FI2021/050908 dated Mar. 25, 2022, 17 pages.

LG Electronics Inc., "[Post109bis-e][957][V2X]: MAC issues (LG)", 3GPP TSG-RAN WG2 #110-e, draft1_R2-200xxxx, (Jun. 1-12, 2020), 70 pages.

LG Electronics, "Discussion on physical layer design considering sidelink DRX operation", 3GPP TSG RAN WG1 #103-e, R1-2007897, (Oct. 26-Nov. 13, 2020), 15 pages.

LG Electronics, "WID revision: NR sidelink enhancement", 3GPP TSG RAN Meeting #89e, RP-201516, (Sep. 14-18, 2020), 7 pages.

Nokia et al., "SL DRX Timers", 3GPP TSG-RAN WG2 Meeting #113bis Electronic, R2-2103478, (Apr. 12-20, 2021), 3 pages.

Notice of Allowance for Finland U.S. Appl. No. 20/215,032 dated Sep. 30, 2022, 10 pages.

Office Action for Finland U.S. Appl. No. 20/215,032 dated Aug. 31, 2021, 12 pages.

* cited by examiner

FEEDBACK SIGNAL DETECTION FOR SIDELINK DISCONTINUOUS RECEPTION

CROSS-REFERENCE TO RELATED APPLICATIONS

This application is a national phase entry of International Application No. PCT/FI2021/050908, filed Dec. 22, 2021, which claims priority to Finnish Application No. 20215032, filed Jan. 13, 2021, the contents of which are hereby incorporated by reference in their entirety.

FIELD

The following exemplary embodiments relate to wireless communication.

BACKGROUND

In sidelink communication, i.e. device-to-device communication, a terminal device may be utilized to improve the reliability of connectivity for directly communicating with another terminal device. This may enable better usage of resources and enhanced user experience to the user of the terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: receive a first transmission from a first terminal device, wherein the first transmission indicates one or more resources to be used at least for a second transmission to the apparatus; monitor one or more physical feedback channel resources associated with the indicated one or more resources; detect one or more feedback signals from the monitored one or more physical feedback channel resources; and extend a wake-up time of the apparatus based at least partly on the detected one or more feedback signals.

According to another aspect, there is provided an apparatus comprising means for: receiving a first transmission from a first terminal device, wherein the first transmission indicates one or more resources to be used at least for a second transmission to the apparatus; monitoring one or more physical feedback channel resources associated with the indicated one or more resources; detecting one or more feedback signals from the monitored one or more physical feedback channel resources; and extending a wake-up time of the apparatus based at least partly on the detected one or more feedback signals.

According to another aspect, there is provided a method comprising: receiving a first transmission from a first terminal device, wherein the first transmission indicates one or more resources to be used at least for a second transmission; monitoring one or more physical feedback channel resources associated with the indicated one or more resources; detecting one or more feedback signals from the monitored one or more physical feedback channel resources; and extending a wake-up time based at least partly on the detected one or more feedback signals.

According to another aspect, there is provided a computer program comprising instructions for causing an apparatus to perform at least the following: receive a first transmission from a first terminal device, wherein the first transmission indicates one or more resources to be used at least for a second transmission to the apparatus; monitor one or more physical feedback channel resources associated with the indicated one or more resources; detect one or more feedback signals from the monitored one or more physical feedback channel resources; and extend a wake-up time of the apparatus based at least partly on the detected one or more feedback signals.

According to another aspect, there is provided a computer readable medium comprising program instructions for causing an apparatus to perform at least the following: receive a first transmission from a first terminal device, wherein the first transmission indicates one or more resources to be used at least for a second transmission to the apparatus; monitor one or more physical feedback channel resources associated with the indicated one or more resources; detect one or more feedback signals from the monitored one or more physical feedback channel resources; and extend a wake-up time of the apparatus based at least partly on the detected one or more feedback signals.

According to another aspect, there is provided a non-transitory computer readable medium comprising program instructions for causing an apparatus to perform at least the following: receive a first transmission from a first terminal device, wherein the first transmission indicates one or more resources to be used at least for a second transmission to the apparatus; monitor one or more physical feedback channel resources associated with the indicated one or more resources; detect one or more feedback signals from the monitored one or more physical feedback channel resources; and extend a wake-up time of the apparatus based at least partly on the detected one or more feedback signals.

According to another aspect, there is provided a system comprising at least a first terminal device, a second terminal device, and a third terminal device. The first terminal device is configured to: transmit a first transmission at least to the second terminal device and to the third terminal device, wherein the first transmission indicates one or more resources to be used for a second transmission at least to the second terminal device and to the third terminal device; and transmit the second transmission at least to the second terminal device and to the third terminal device over the indicated one or more resources. The second terminal device is configured to: receive the first transmission from the first terminal device; receive at least a part of the second transmission from the first terminal device; and transmit one or more feedback signals to the first terminal device in response to receiving at least the part of the second transmission, wherein the one or more feedback signals are transmitted over one or more physical feedback channel resources associated with the indicated one or more resources. The third terminal device is configured to: receive the first transmission from the first terminal device; monitor the one or more physical feedback channel resources; detect the one or more feedback signals from the monitored one or more physical feedback channel resources; and extend a wake-up time of the third terminal device based at least partly on the detected one or more feedback signals.

According to another aspect, there is provided a system comprising at least a first terminal device, a second terminal device, and a third terminal device. The first terminal device comprises means for: transmitting a first transmission at least to the second terminal device and to the third terminal device, wherein the first transmission indicates one or more resources to be used for a second transmission at least to the second terminal device and to the third terminal device; and transmitting the second transmission at least to the second terminal device and to the third terminal device over the indicated one or more resources. The second terminal device comprises means for: receiving the first transmission from the first terminal device; receiving at least a part of the second transmission from the first terminal device; and transmitting one or more feedback signals to the first terminal device in response to receiving at least the part of the second transmission, wherein the one or more feedback signals are transmitted over one or more physical feedback channel resources associated with the indicated one or more resources. The third terminal device comprises means for: receiving the first transmission from the first terminal device; monitoring the one or more physical feedback channel resources; detecting the one or more feedback signals from the monitored one or more physical feedback channel resources; and extending a wake-up time of the third terminal device based at least partly on the detected one or more feedback signals.

According to another aspect, there is provided an apparatus comprised in a first terminal device, the apparatus comprising at least one processor, and at least one memory including computer program code, wherein the at least one memory and the computer program code are configured, with the at least one processor, to cause the apparatus to: transmit a first transmission to one or more second terminal devices and to a third terminal device, wherein the first transmission indicates one or more resources reserved at least for a second transmission from the first terminal device; and transmit the second transmission to the one or more second terminal devices and to the third terminal device over the indicated one or more resources, wherein a time difference between the first transmission and the second transmission is smaller than a value of an inactivity timer used by at least one of the third terminal device and/or the one or more second terminal devices, and/or a number of skipped transmissions between the first transmission and the second transmission over the indicated one or more resources is smaller than a threshold value of a counter used by at least one of the third terminal device and/or the one or more second terminal devices.

According to another aspect, there is provided an apparatus comprised in a first terminal device, wherein the apparatus comprises means for: transmitting a first transmission to one or more second terminal devices and to a third terminal device, wherein the first transmission indicates one or more resources reserved at least for a second transmission from the first terminal device; and transmitting the second transmission to the one or more second terminal devices and to the third terminal device over the indicated one or more resources, wherein a time difference between the first transmission and the second transmission is smaller than a value of an inactivity timer used by at least one of the third terminal device and/or the one or more second terminal devices, and/or a number of skipped transmissions between the first transmission and the second transmission over the indicated one or more resources is smaller than a threshold value of a counter used by at least one of the third terminal device and/or the one or more second terminal devices.

According to another aspect, there is provided a method carried out by a first terminal device, the method comprising: transmitting a first transmission to one or more second terminal devices and to a third terminal device, wherein the first transmission indicates one or more resources reserved at least for a second transmission from the first terminal device; and transmitting the second transmission to the one or more second terminal devices and to the third terminal device over the indicated one or more resources, wherein a time difference between the first transmission and the second transmission is smaller than a value of an inactivity timer used by at least one of the third terminal device and/or the one or more second terminal devices, and/or a number of skipped transmissions between the first transmission and the second transmission over the indicated one or more resources is smaller than a threshold value of a counter used by at least one of the third terminal device and/or the one or more second terminal devices.

According to another aspect, there is provided a computer program comprising instructions for causing an apparatus comprised in a first terminal device to perform at least the following: transmit a first transmission to one or more second terminal devices and to a third terminal device, wherein the first transmission indicates one or more resources reserved at least for a second transmission from the first terminal device; and transmit the second transmission to the one or more second terminal devices and to the third terminal device over the indicated one or more resources, wherein a time difference between the first transmission and the second transmission is smaller than a value of an inactivity timer used by at least one of the third terminal device and/or the one or more second terminal devices, and/or a number of skipped transmissions between the first transmission and the second transmission over the indicated one or more resources is smaller than a threshold value of a counter used by at least one of the third terminal device and/or the one or more second terminal devices.

According to another aspect, there is provided a computer readable medium comprising program instructions for causing an apparatus comprised in a first terminal device to perform at least the following: transmit a first transmission to one or more second terminal devices and to a third terminal device, wherein the first transmission indicates one or more resources reserved at least for a second transmission from the first terminal device; and transmit the second transmission to the one or more second terminal devices and to the third terminal device over the indicated one or more resources, wherein a time difference between the first transmission and the second transmission is smaller than a value of an inactivity timer used by at least one of the third terminal device and/or the one or more second terminal devices, and/or a number of skipped transmissions between the first transmission and the second transmission over the indicated one or more resources is smaller than a threshold value of a counter used by at least one of the third terminal device and/or the one or more second terminal devices.

According to another aspect, there is provided a non-transitory computer readable medium comprising program instructions for causing an apparatus comprised in a first terminal device to perform at least the following: transmit a first transmission to one or more second terminal devices and to a third terminal device, wherein the first transmission indicates one or more resources reserved at least for a second transmission from the first terminal device; and transmit the second transmission to the one or more second terminal devices and to the third terminal device over the indicated one or more resources, wherein a time difference between the first transmission and the second transmission is smaller than a value of an inactivity timer used by at least one of the third terminal device and/or the one or more second terminal devices, and/or a number of skipped transmissions between the first transmission and the second transmission over the indicated one or more resources is smaller than a threshold value of a counter used by at least one of the third terminal device and/or the one or more second terminal devices.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. For example, some exemplary embodiments may be applied to sidelink communication over the PC5 air interface and/or uplink/downlink over the Uu interface. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
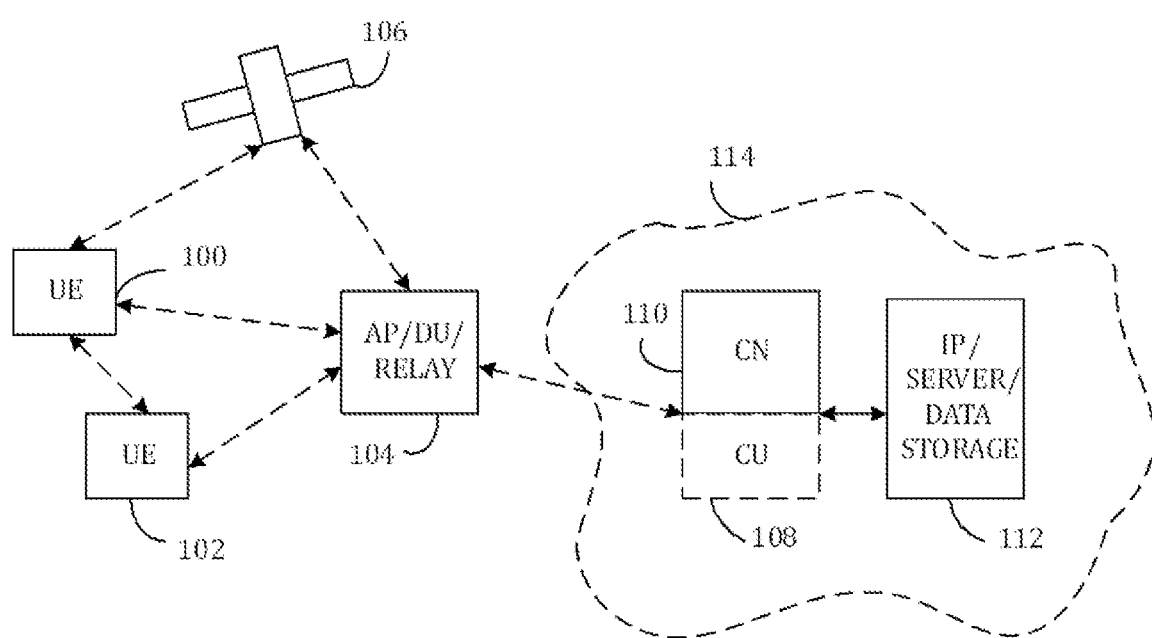
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g)NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 2 or layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a relay node, for example layer 2/3 relay) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the same infrastructure to run services that have different requirements on latency, reliability, throughput and mobility.

The current architecture in LTE networks may be fully distributed in the radio and fully centralized in the core network. The low latency applications and services in 5G may require to bring the content close to the radio which leads to local break out and multi-access edge computing (MEC). 5G may enable analytics and knowledge generation to occur at the source of the data. This approach may require leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be required to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Sidelink communication enables direct communication between UEs, as well as relay traffic between a network and a UE or between two UEs via a relay UE. NR sidelink may support for example advanced vehicle-to-everything (V2X) communications and proximity services (ProSe) communication. In comparison to LTE sidelink, NR sidelink may provide higher reliability and lower latency. NR sidelink may also support sidelink groupcast transmission, wherein a sidelink transmitter (TX) UE may multicast its data to a group of sidelink receiver (RX) UEs. In order to ensure the reliability of such a groupcast transmission, hybrid automatic repeat request (HARQ) feedback schemes may be used in sidelink groupcast, such that the sidelink TX UE can be aware of the reception status at the RX UEs. In other words, after the sidelink TX UE groupcasts sidelink control information (SCI) and the corresponding data payload over the selected, or allocated, physical sidelink control channel (PSCCH) and/or physical sidelink shared channel (PSSCH) resources, a sidelink RX UE involved in receiving the sidelink groupcast may indicate its reception status over a physical sidelink feedback channel (PSFCH) resource associated with those PSCCH and/or PSSCH resources used by the sidelink TX UE. The mapping between a PSCCH/PSSCH transmission/reception and the corresponding PSFCH resource may be specified such that both the sidelink TX UE and the sidelink RX UEs know where the PSFCH resources are located.

In sidelink groupcast HARQ option 1, the sidelink TX UE may indicate a range parameter in its transmitted SCI and, thus, a sidelink RX UE within range of the sidelink TX UE sends a non-acknowledgement (NACK) feedback, if it successfully decodes the SCI but fails in decoding the data payload. This may also be referred to as a "negative-only acknowledgement". Otherwise, the sidelink RX UE may not transmit any feedback. In this option, the sidelink RX UEs sending NACK may use a common, or shared, PSFCH resource. The common/shared PSFCH resource may be determined by sidelink RX UEs and the sidelink TX UE by considering the starting subchannel or subchannels and the slot used for the associated PSSCH transmissions, as well as the Layer-1 (L1) source identifier (ID) provided by the SCI.

In sidelink groupcast HARQ option 2, a sidelink RX UE sends either an acknowledgement (ACK) for example if it has successfully received the PSCCH and PSSCH, or a NACK for example if it successfully decodes the SCI but fails in decoding the data payload, or nothing for example if it does not detect or decode the SCI. This may also be referred to as "positive-negative acknowledgement". In this option, each of the sidelink RX UEs sends its feedback over a dedicated, i.e UE-specific, PSFCH resource. In order to determine the dedicated PSFCH resources used by the RX UEs, besides the information needed and listed before for HARQ option 1, the RX UEs may also use their group member identifier (ID), which may be a unique ID in the considered group. Thus, the unique group member ID of the RX UEs may ensure a dedicated UE-specific PSFCH resource for the RX UEs to send their HARQ feedbacks. The sidelink TX UE may derive the PSFCH resource in a similar manner. This option may be used, or selected, by the sidelink TX UE for example if its upper layer, such as V2X layer and/or application layer, passes the group size and the member ID to the access stratum (AS) layer and the group size is not greater than the number of candidate PSFCH resources associated with the selected PSCCH and/or PSSCH resource.

Accordingly, when the sidelink TX UE groupcasts its data, the associated SCI indicates the HARQ option that should be used by the intended sidelink RX UEs to send their feedbacks.

Currently, the sidelink RX UE may need to be always awake to monitor and receive the information carried in the PC5 air interface. Such behaviour may result in high energy consumption, which may limit the applicability of sidelink communication in power-constrained devices. However, energy consumption may be reduced by applying sidelink discontinuous reception (DRX), which may use for example the Uu DRX configuration as a baseline. In the Uu interface, a discontinuous reception inactivity timer, denoted as DRX-InactivityTimer, may be configured by the network to a UE in order to extend the DRX on-duration at the UE.

Figure 2:
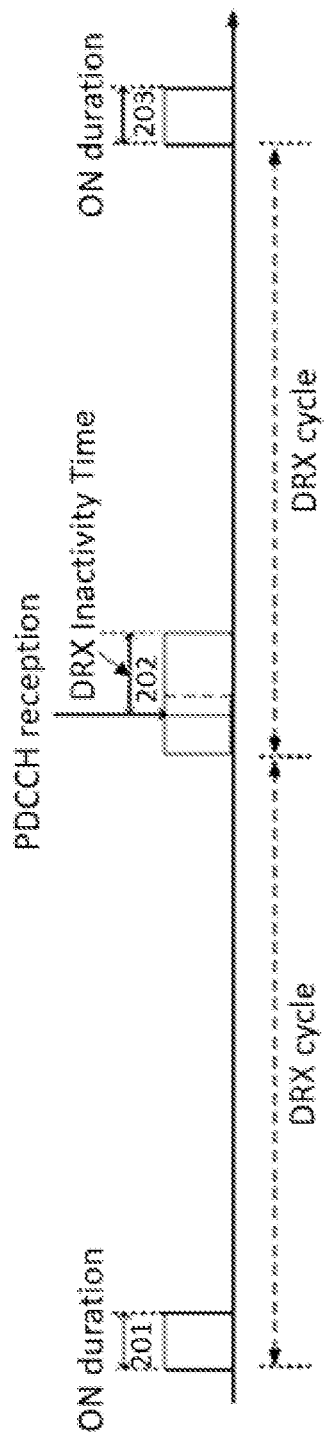
FIG. 2 illustrates a discontinuous reception scheme.

FIG. 2 illustrates the current behaviour of a UE configured with Uu DRX to extend the DRX on-duration by DRX-InactivityTimer. As can be seen from FIG. 2, a UE may be configured with Uu DRX to save energy. With the Uu DRX configuration, the UE wakes up and monitors the physical downlink control channel (PDCCH) during the DRX on-duration 201. If it does not detect a downlink control information (DCI) addressed to itself during the DRX on-duration, the UE goes to sleep mode, i.e. a low-power state with reduced energy consumption. In this case, it wakes up and monitors the PDCCH again in the next DRX on-duration. If a DCI addressed to the UE is received during the DRX on-duration, the UE (re)starts its DRX-Inactivity Timer 202. While the DRX-Inactivity Timer 202 is running, the UE does not go to sleep mode and instead continues to monitor the Uu interface. When a new DCI is received during the running of DRX-InactivityTimer, the UE resets its DRX-InactivityTimer to zero and restarts it. When the DRX-InactivityTimer 202 expires, the UE goes to sleep mode until the next DRX on-duration 203. Afterwards, the above-mentioned procedure repeats. Therefore, the DRX-InactivityTimer may be used to extend the DRX on-duration once there is any data to be transmitted from the network to the UE.

In some cases, the sidelink groupcast TX UE may not rely on the HARQ feedback received from the sidelink groupcast RX UEs to decide the sidelink DRX status of sidelink groupcast RX UEs. There may be several reasons for a sidelink groupcast RX UE to not send HARQ feedback to the sidelink TX UE in sidelink groupcast option 2. For example, the sidelink RX UE may fail to decode the SCI from the sidelink TX UE, i.e. the sidelink RX UE may not know if and where the PSFCH resource is to transmit the HARQ feedback. Furthermore, the RX UE may deprioritize its HARQ transmission due to its activity collision with other transmission(s) and/or reception(s). Therefore, if the TX UE decides to stop its groupcast based on detecting a discontinuous transmission (DTX) HARQ feedback and wait for the next sidelink DRX on-duration to resume its group transmission, this may cause additional latency and/or service interruption.

The SCI associated to a data transmission may include a $1^{st}$ stage SCI and $2^{nd}$ stage SCI, the contents of which are defined below.

The fields defined in $1^{st}$ stage SCI formats may be mapped to the information bits $a_0$ to $a_{A-1}$ as follows: each field is mapped in the order in which it appears in the description, with the first field mapped to the lowest order information bit $a_0$, and each successive field mapped to higher order information bits. The most significant bit of each field is mapped to the lowest order information bit for that field. For example, the most significant bit of the first field may be mapped to $a_0$.

SCI format 1-A may be used for the scheduling of PSSCH and $2^{nd}$ stage SCI on PSSCH. The following information may be transmitted by means of the SCI format 1-A:

Priority: 3 bits.

Frequency resource assignment:

$$\left\lceil \log_2\left(\frac{N_{subChannel}^{SL}(N_{subChannel}^{SL}+1)}{2}\right)\right\rceil$$

bits when the value of the higher layer parameter sl-MaxNumPerReserve is configured to 2; otherwise $$\left\lceil \log_2\left(\frac{N_{subChannel}^{SL}(N_{subChannel}^{SL}+1)(2N_{subChannel}^{SL}+1)}{6}\right)\right\rceil$$

bits when the value of the higher layer parameter sl-MaxNumPerReserve is configured to 3. $N_{subchannel}^{SL}$ is the number of sub-channels in a resource pool provided according to the higher layer parameter sl-NumSubchannel.

Time resource assignment: 5 bits when the value of the higher layer parameter sl-MaxNumPerReserve is configured to 2; otherwise 9 bits when the value of the higher layer parameter sl-MaxNumPerReserve is configured to 3.

Resource reservation period: $\lceil \log_2 N_{rsv\_period}\rceil$ bits, where $N_{rsv\_period}$ is the number of entries in the higher layer parameter sl-ResourceReservePeriodList, if the higher layer parameter sl-MultiReserveResource is configured; 0 bit otherwise.

Demodulation reference signal (DMRS) pattern–$\lceil \log_2 N_{pattern}\rceil$ bits, where $N_{pattern}$ is the number of DMRS patterns configured by the higher layer parameter si-PSSCH-DMRS-TimePatternList; 0 bit if si-PSSCH-DMRS-TimePattern List is not configured.

$2^{nd}$ stage SCI format: 2 bits as defined in Table 1 below.

Beta_offset indicator: 2 bits as provided by the higher layer parameter sl-BetaOffsets2ndSCI and Table 2 below.

Number of DMRS port: 1 bit as defined in Table 3 below.

Modulation and coding scheme (MCS): 5 bits.

Additional MCS table indicator: 1 bit if one MCS table is configured by the higher layer parameter sl-Additional-MCS-Table; 2 bits if two MCS tables are configured by the higher layer parameter sl-Additional-MCS-Table; 0 bit otherwise.

PSFCH overhead indication: 1 bit if the higher layer parameter sl-PSFCH-Period is 2 or 4; 0 bit otherwise.

Reserved: a number of bits as determined by the higher layer parameter sl-NumReservedBits, with value set to zero.

TABLE 1

| Value of $2^{nd}$ stage SCI format field | $2^{nd}$ stage SCI format |
|---|---|
| 00 | SCI format 2-A |
| 01 | SCI format 2-B |
| 10 | Reserved |
| 11 | Reserved |

TABLE 2

| Value of Beta_offset indicator | Beta_offset index |
|---|---|
| 00 | $1^{st}$ index provided by higher layer parameter sl-BetaOffsets2ndSCI |
| 01 | $2^{nd}$ index provided by higher layer parameter sl-BetaOffsets2ndSCI |
| 10 | $3^{rd}$ index provided by higher layer parameter sl-BetaOffsets2ndSCI |
| 11 | $4^{th}$ index provided by higher layer parameter sl-BetaOffsets2ndSCI |

TABLE 3

| Value of the Number of DMRS port field | Antenna ports |
|---|---|
| 0 | 1000 |
| 1 | 1000 and 1001 |

The fields defined in $2^{nd}$ stage SCI formats may be mapped to the information bits $a_0$ to $a_{A-1}$ as follows: each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

SCI format 2-A may be used for the decoding of PSSCH, with HARQ operation when HARQ-ACK information includes ACK or NACK, or when there is no feedback of HARQ-ACK information. The following information may be transmitted by means of the SCI format 2-A:

HARQ process number: 4 bits

New data indicator: 1 bit

Redundancy version: 2 bits

Source ID: 8 bits

Destination ID: 16 bits

HARQ feedback enabled/disabled indicator: 1 bit

Cast type indicator: 2 bits as defined in Table 4 below

Channel state information (CSI) request: 1 bit

TABLE 4

| Value of Cast type indicator | Cast type |
| --- | --- |
| 00 | Broadcast |
| 01 | Groupcast |
| 10 | Unicast |
| 11 | Reserved |

SCI format 2-B may be used for the decoding of PSSCH, with HARQ operation when HARQ-ACK information includes only NACK, or when there is no feedback of HARQ-ACK information. The following information may be transmitted by means of the SCI format 2-B:
  HARQ process number: 4 bits
  New data indicator: 1 bit
  Redundancy version: 2 bits
  Source ID: 8 bits
  Destination ID: 16 bits
  HARQ feedback enabled/disabled indicator: 1 bit
  Zone ID: 12 bits
  Communication range requirement: 4 bits Thus, SCI can indicate the information used for sensing purposes. For example, a sidelink TX UE may send an SCI and indicate the reserved sidelink resources to nearby UEs, and thus the nearby UEs can avoid using those reserved resources. In addition, the SCI may also contain information used to identify receiver(s) that should receive the data payload, for example by using the source ID and/or destination ID carried in the $2^{nd}$ stage SCI.

As mentioned previously, the Uu DRX scheme may be used as a baseline for sidelink groupcast DRX configuration, for example resetting/restarting the sidelink DRX-InactivityTimer upon receiving/decoding an SCI, such as a first stage SCI and/or a second stage SCI addressed to the considered sidelink RX UE.

Figure 3:
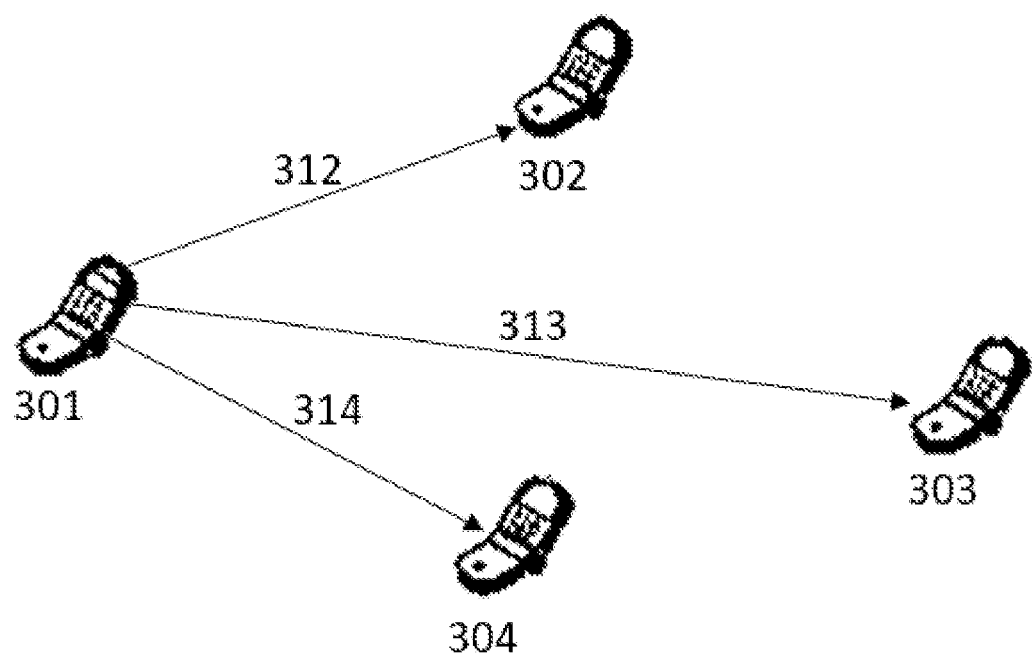
FIG. 3 illustrates a sidelink groupcast system.

FIG. 3 illustrates a simplified system, wherein a sidelink groupcast transmission 312, 313, 314 is transmitted from a sidelink TX UE 301 to sidelink RX UEs 302, 303, 304.

Figure 4:
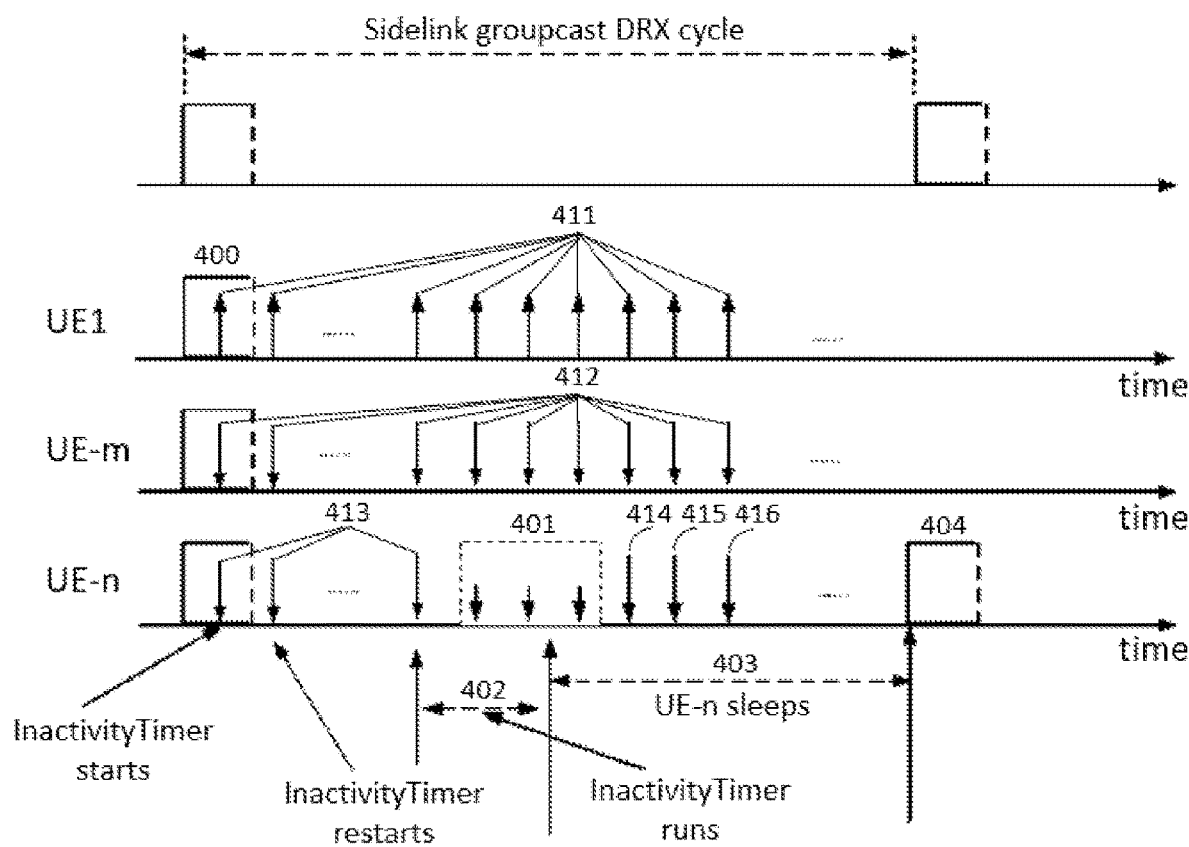
FIG. 4 illustrates time-domain behaviour of sidelink terminal devices according to a discontinuous reception scheme.

FIG. 4 illustrates the time-domain behavior at the sidelink groupcast TX UE and the sidelink groupcast RX UEs with regard to sidelink DRX. The upward-facing arrows 411 in FIG. 4 indicate sidelink groupcast transmissions sent by the sidelink TX UE (denoted as UE1), to sidelink RX UEs (denoted as UE-m and UE-n). The abbreviations m and n may refer to the group member IDs of the two RX UEs used in the considered groupcast, for example if HARQ option 2 is used. The downward-facing arrows 412, 413 in FIG. 4 indicate reception of the sidelink groupcast transmissions by UE-m and UE-n. UE-m in FIG. 4 may be, for example, the UE 302 or the UE 303 of FIG. 3, for example referring to a UE with good radio conditions to receive the sidelink groupcast from UE1. In addition, there may be a (pre-) configured sidelink DRX configuration for the considered groupcast from UE1 to the other UEs in the group. Once there is sidelink data generated at UE1, for example at the V2X and/or application layer of UE1, UE1 may start to groupcast to the other UEs of the group periodically for example starting from a resource within the next sidelink DRX on-duration 400. Since UE-m is a groupcast RX UE with good radio conditions with regard to UE1, UE-m resets and restarts its sidelink DRX-InactivityTimer after receiving and decoding a transmission from UE1 to the group. It is noted that the sidelink DRX-InactivityTimer may be reset and restarted by a receiving UE in the group, for example upon receiving and decoding an SCI intended for the considered groupcast/group and/or a data payload intended for the considered groupcast/group, wherein the SCI may comprise a first stage SCI and/or a second stage SCI. However, during the periodic transmissions from UE1, UE-n may enter a phase with temporary bad radio conditions from UE1, depicted in FIG. 4 by the time interval 401, and thus UE-n fails in decoding the transmission, such as SCI, transmitted by UE1 during this time. The bad radio conditions may be caused by, for example, a temporary interference due to other sidelink transmissions near UE-n, or a temporary obstacle between UE1 and UE-n due to mobility. In this case, the sidelink DRX-InactivityTimer at UE-n continues to run during the time interval 402 without being reset/restarted. If the sidelink DRX-InactivityTimer at UE-n expires before successfully receiving/decoding another transmission, such as an SCI, from UE1 addressed to the same groupcast destination ID, UE-n goes to sleep mode for a time interval 403 until the start of the next sidelink DRX on-duration 404. As illustrated in FIG. 4, the temporarily deteriorated radio conditions may cause UE-n to miss (re) starting its sidelink DRX-InactivityTimer and thus it may go to sleep mode too early, even though there is still data being groupcasted from UE1 to the group including UE-n, and the bad radio conditions between UE1 and UE-n may be resolved before the next sidelink DRX on-duration 404. Thus, UE-n is not monitoring the sidelink groupcast transmissions 414, 415, 416 sent by UE1 during improved radio conditions, since UE-n is in sleep mode.

Some exemplary embodiments may enable a sidelink groupcast RX UE (for example UE-n in FIG. 4), after failing to decode a transmission, such as an SCI, over a (pre-) reserved PSCCH/PSSCH resource, to monitor the HARQ feedback from one or more other sidelink groupcast RX UEs (for example UE-m in FIG. 4) in order to determine if its sidelink DRX-InactivityTimer should be restarted. Thus, UE-n may extend its sidelink DRX on-duration, when there is still data to be received from UE1. Therefore, once the radio conditions of UE-n improve, UE-n is able to return quickly back to normal behaviour and continue receiving data from UE1. This way, some exemplary embodiments may prevent UE-n from mistakenly going to sleep mode for example during a temporary period of bad radio conditions, and thus from missing reserved/periodic sidelink groupcast transmissions when its radio conditions improve.

In some exemplary embodiments, the sidelink groupcast DRX procedure may use the previously described Uu DRX procedure as a baseline. For example, a sidelink groupcast RX UE may extend its wakeup time, i.e. on-duration, by using sidelink DRX-InactivityTimer upon receiving a transmission to the configured group, such as an SCI addressed to the sidelink groupcast RX UEs. In order to configure the sidelink DRX information, for example sidelink DRX cycle, sidelink DRX on-duration, and sidelink DRX-Inactivity-Timer, for the considered groupcast, different approaches may also be applied. As an example, the sidelink DRX configuration of a groupcast service may be provisioned by the network to the sidelink UE via Uu interface or by pre-configuration. Alternatively, a group device, for example the group leader or the sidelink groupcast TX UE, may coordinate and/or unicast/multicast/broadcast the DRX configuration to other UEs in the group.

Figure 5:
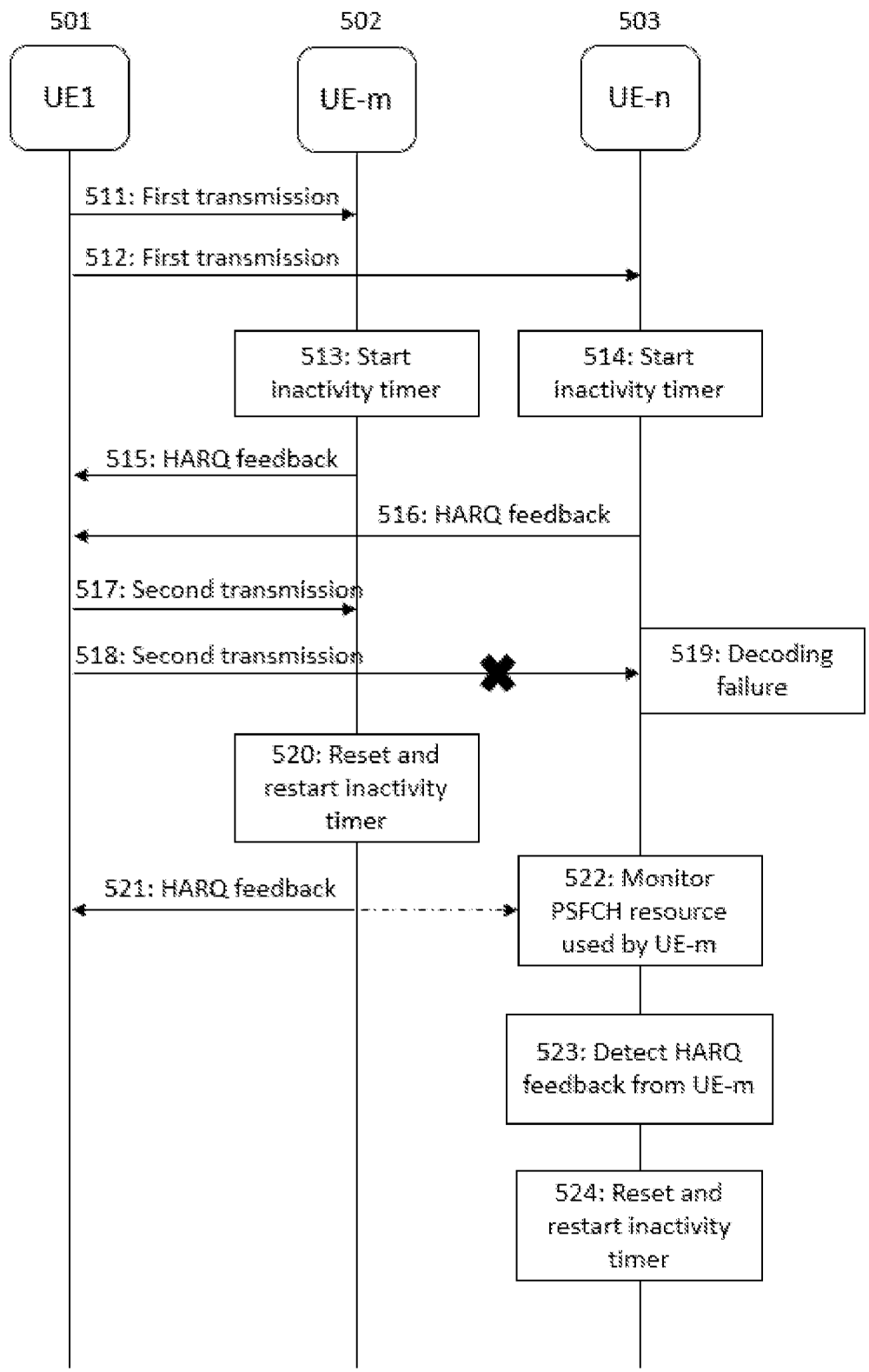
FIG. 5 illustrates a signalling diagram according to an exemplary embodiment.

FIG. 5 illustrates a signalling diagram according to an exemplary embodiment. A first UE 501 (denoted as UE1), i.e. a sidelink groupcast TX UE, transmits 511, 512, or groupcasts, a first transmission to a second UE 502 (denoted as UE-m) and to a third UE 503 (denoted as UE-n), wherein UE-m and UE-n are sidelink groupcast RX UEs. The first transmission indicates the future PSCCH and/or PSSCH resource(s) reserved by UE1 for the considered sidelink groupcast. Thus, the first transmission enables UE-m and UE-n to derive the corresponding PSFCH resource(s) for both UE-m and UE-n for future groupcast transmission(s) over the reserved PSCCH and/or PSSCH resource(s). As a non-limiting example, the first transmission may comprise a first set of SCI and/or data, and the first set of SCI may or may not be associated with the data payload. Furthermore, the first transmission may indicate the use of sidelink HARQ option 1 or option 2 for the groupcast RX UEs to send their HARQ feedbacks over the shared or dedicated PSFCH resource(s). The abbreviations m and n of UE-m and UE-n may refer to the group member IDs of the two RX UEs used in the considered groupcast, for example if HARQ option 2 is used.

UE-m (re)sets and (re)starts 513 its sidelink DRX-Inactivity Timer based on the received first transmission. UE-n also (re)sets and (re)starts 514 its sidelink DRX-InactivityTimer based on the received first transmission. In addition, UE-m and UE-n transmit 515, 516 their HARQ feedbacks based on the sidelink HARQ option indicated by the received first transmission. For example, UE-m transmits 515 HARQ feedback, such as an ACK or NACK, to UE1, and UE-n also transmits 516 HARQ feedback to UE1, such as an ACK indicating successful decoding of the first set of SCI and the associated data payload.

UE1 transmits 517 a second transmission, for example comprising a second set of SCI and/or data, to UE-m over the resource(s) indicated in the first transmission. UE1 also transmits 518 the second transmission, for example comprising the second set of SCI and/or data, to UE-n over the indicated resource(s), but UE-n fails 519 to receive and decode the second transmission for example due to poor radio conditions. It is noted that UE-n may fail to receive and decode a part or all of the second transmission. For example, UE-n may receive the $1^{st}$ stage SCI successfully but fail to receive the $2^{nd}$ stage SCI and/or the data payload. It is also noted that the second transmission 517, 518 may be realized by a groupcast transmission over the indicated PSCCH and/or PSSCH resource(s) and the second set of SCI may comprise a $1^{st}$ stage SCI and/or a $2^{nd}$ stage SCI to the considered groupcast/group. In addition, in some exemplary embodiments, the second transmission/groupcast 517, 518 over the indicated resource(s) may be transmitted by another group member in the considered group of UEs instead of UE1, wherein the source ID of the other group member may be obtained by other RX UEs including UE-n for example by receiving the other group member's (previous) groupcast to the group.

UE-m resets and restarts 520 its sidelink DRX-Inactivity Timer based on the received second transmission, and transmits 521 HARQ feedback to UE1 or to the other group member. In other words, the reset and restart of the timer is triggered by receiving the second transmission. UE-n monitors 522 the PSFCH resource(s) used by UE-m and/or one or more other groupcast RX UEs, wherein the PSFCH resource(s) used by UE-m and/or the one or more other groupcast RX UEs may be derived, for example, as described in step 512 and/or by using the source ID of the other group member performing the second transmission/groupcast 517, 518. The monitoring allows UE-n to determine if there is still data groupcasted from UE1 or the other group member to the RX UEs. During the monitoring, UE-n detects 523 the HARQ feedback 521, for example ACK or NACK, transmitted from UE-m and/or the one or more other UEs to UE1 or the other group member. UE-n then determines that there was data, for example the second transmission 517, 518, groupcasted to the group. Although UE-n did not detect/receive the second transmission itself, UE-n resets and restarts 524 its sidelink DRX-InactivityTimer based on the detected HARQ feedback 521. While the sidelink DRX-InactivityTimer is running, UE-n does not go to sleep mode and is therefore able to receive any incoming transmissions from UE1 or another group member.

In other words, since the sidelink DRX-InactivityTimer at UE-n is restarted based on the detected HARQ feedback(s), it prolongs the wake-up time duration at UE-n and prevents UE-n from going to sleep mode. Thus, once the radio conditions at UE-n improve, UE-n may receive a fresh set of SCI and/or the associated data payload from UE1 or another group member directly. It should be noted that UE-n may return back to the baseline behaviour once its radio conditions improve. In the baseline behaviour, UE-n resets and restarts its sidelink DRX-Inactivity Timer if a transmission, for example comprising SCI, associated with the considered groupcast is received.

The functions and/or blocks described above by means of FIG. 5 are in no absolute chronological order, and some of them may be performed simultaneously or in an order differing from the described one. Other functions and/or blocks may also be executed between them or within them. For example, the first transmissions 511, 512 may occur substantially simultaneously, and the second transmissions 517, 518 may occur substantially simultaneously.

It should be noted that the number of RX UEs may vary from what is shown in FIG. 5. In some exemplary embodiments, UE-n may detect one or more feedback signals from a plurality of other RX UEs, wherein the one or more feedback signals indicate receiving at least a part of the second transmission by the plurality of other RX UEs.

In some cases, after receiving the first transmission 512 indicating the future resource(s), UE-n may go to a sleep mode or power saving mode for the considered transmission/groupcast to the group, and wake up before the next indicated resource(s) to receive the next transmission(s)/groupcast(s) over the indicated resource(s), for example the second transmission 518, from UE1 or another group member. In these cases, if UE-n does not receive/decode a (pre-)configured number (denoted as N1, where N1 is an integer equal to or larger than 1) of consecutive transmission(s)/groupcast(s) over the indicated resource(s), UE-n may consider that there is no more data to be transmitted/groupcast over the indicated resource(s) to the considered group. Then, accordingly, UE-n wakes up in its next SL DRX on-duration for receiving potential transmission(s)/groupcast(s) for example from UE1 and/or another group member. In these cases, UE-n may be configured to reset and restart a counter with an initial value of 0, if it receives/decodes a transmission/groupcast from UE1 or another group member for example over the indicated resource. Otherwise, if it does not receive/decode a transmission/groupcast to the group over the indicated resource, the counter may be increased by 1. Thus, if the counter increases and reaches the value of N1, UE-n may stop monitoring the indicated resource(s) until its next SL DRX on-duration. In these cases, some exemplary embodiments may also be applied to extend UE-n's wake-up time for monitoring the indicated resource(s). For example, if UE-n fails in decoding the second transmission for example in step 519 of FIG. 5, UE-n may perform steps 522 and 523 of FIG. 5 instead of increasing the counter. If UE-n detects the HARQ feedback transmitted by UE-m, it does not increase the counter, since UE-n determines that there was a second transmission transmitted/groupcasted by UE1 or another group member in step 518. Otherwise, if UE-n does not detect the HARQ feedback transmitted by other RX UE(s), it increases the counter by 1.

It is noted that some exemplary embodiments are not limited to using sidelink DRX-InactivityTimer to extend UE-n's wake-up time, and some exemplary embodiments may also be applied in other cases to extend UE-n's wake up time. For example, this can be done by resetting the counter for consecutive missing/unsuccessful reception(s) over the indicated PSCCH/PSSCH resource(s), wherein the counter is used by UE-n to decide if there is no more groupcast data for the considered group, and if it should skip monitoring the indicated PSCCH/PSSCH resource(s) until the next SL DRX on-duration.

In another exemplary embodiment, UE-n may perform the steps 522, 523 and 524 of FIG. 5, if it successfully decodes a part of the second transmission over the indicated resource(s) in step 519, for example the $1^{st}$ stage SCI, but not the other part of the second transmission, for example the $2^{nd}$ stage SCI and/or the data payload. In this exemplary embodiment, the decodable part of the second transmission should align with the information obtained from the first transmission. For example, the PSCCH/PSSCH time-and/or-frequency resource(s) indicated in the decodable $1^{st}$ stage SCI of the second transmission may be substantially the same or covered by the PSCCH/PSSCH resource(s) indicated in the first transmission. Otherwise, UE-n does not perform steps 522, 523, and 524. This exemplary embodiment enables UE-n to check the HARQ feedback(s) from other RX UE(s), if it detects the second transmission over the indicated resource(s) by receiving a part of the second transmission, for example the $1^{st}$ stage SCI, which may be more robust than the $2^{nd}$ stage SCI and the data payload.

In another exemplary embodiment, UE-n may decide to extend its wake-up time, for example by resetting and restarting its sidelink DRX-InactivityTimer, if UE-n successfully decodes a part of the second transmission, for example the $1^{st}$ stage SCI, over the indicated resource(s) in step 519, but not the other part of the second transmission, for example the $2^{nd}$ stage SCI and/or the data payload, as long as the PSCCH/PSSCH time and/or frequency resource(s) indicated in the decodable $1^{st}$ stage SCI of the second transmission are substantially the same or covered by the PSCCH/PSSCH resource(s) indicated in the first transmission.

In another exemplary embodiment, UE-n may initiate monitoring the PSFCH resources of the other RX UE(s), if UE-n receives at most a part of the second transmission, for example the $1^{st}$ stage SCI of the second transmission, over the indicated resource(s), but not the rest of the second transmission, for example the $2^{nd}$ stage SCI and the data payload.

Figure 6:
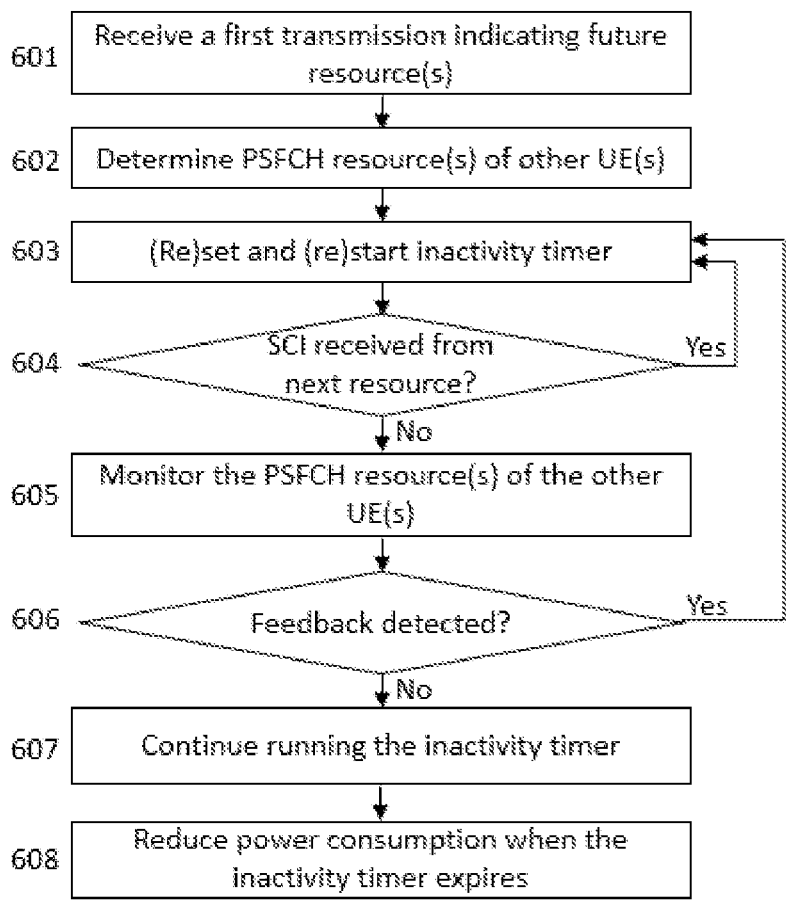
FIGS. 6-8 illustrate flow charts according to some exemplary embodiments.

FIG. 6 illustrates a flow chart according to an exemplary embodiment. The functions illustrated in FIG. 6 may be performed for example by a sidelink groupcast RX UE, such as UE-n of FIG. 5. The RX UE is configured with sidelink DRX for the considered groupcast.

Referring to FIG. 6, a first transmission, for example comprising a first set of SCI associated with the considered groupcast, is received 601 from a first UE (i.e. a sidelink groupcast TX UE), wherein the first transmission indicates reserved PSCCH/PSSCH resource(s) to be used in future transmission(s) from the first UE or another group member. The PSFCH resource(s) of one or more other sidelink groupcast RX UEs associated with the resource(s) indicated by the first transmission are determined 602 based on the first transmission. A sidelink DRX-InactivityTimer is started 603. As the RX UE is monitoring the resource(s) indicated by the first transmission, it checks 604 if a second transmission, for example comprising a second set of SCI, is received from the resource(s) indicated by the first transmission.

If the second transmission is received (604: yes), then the process returns to block 603, i.e. the sidelink DRX-InactivityTimer is reset and restarted in order to extend the wake-up time of the UE for monitoring the indicated resource(s).

If the second transmission, for example at least a part of the second set of SCI, is not received (604: no), then the PSFCH resource(s) of the one or more other RX UEs determined in block 602 are monitored 605 for example over a pre-defined time and/or frequency window.

If a HARQ feedback from the one or more other RX UEs is detected over the monitored PSFCH resource(s) (606: yes), then the process returns to block 603, i.e. the sidelink DRX-Inactivity Timer is reset and restarted. The HARQ feedback may indicate that at least a part of the second transmission is received by the one or more other RX UEs.

If no HARQ feedback from the one or more other RX UEs is detected (606: no), then the sidelink DRX-InactivityTimer continues to run 607 without being reset and the UE reduces 608 power consumption, i.e. goes to sleep mode, if no transmission from the first UE or the one or more other RX UEs is detected before the inactivity timer expires. During sleep mode, the RX UE is not monitoring the indicated resource(s) for transmissions from the first UE or the other group member.

The functions and/or blocks described above by means of FIG. 6 are in no absolute chronological order, and some of them may be performed simultaneously or in an order differing from the described one. Other functions and/or blocks may also be executed between them or within them.

In another exemplary embodiment, the wake-up time of the UE may be extended by using a counter instead of or in addition to the inactivity timer. The counter indicates a number of consecutive unsuccessful receptions of transmissions over the indicated one or more resources. The wake-up time of the UE may be extended by resetting the counter based at least partly on the detected one or more feedback signals. On the other hand, if the counter reaches a value equal to or larger than a pre-defined threshold value, then the UE reduces power consumption for a pre-defined time period, i.e. skips monitoring the indicated resources until the next sidelink DRX on-duration.

In some exemplary embodiments, HARQ option 1 may be used instead of HARQ option 2. If HARQ option 1 is used for the considered sidelink groupcast, then the PSFCH resource determined in block 602 of FIG. 6 may be a common PSFCH resource shared by all of the sidelink RX UEs in the considered groupcast. In this case, in block 605 of FIG. 6 the UE may only need to monitor the determined common PSFCH resource for detecting the HARQ feedback, such as NACK.

In another exemplary embodiment, in order for UE-n to determine the PSFCH resource(s) used by other RX UEs, for example as shown in block 602 of FIG. 6, UE-n may determine the PSFCH resources for a subset of sidelink groupcast RX UEs (for example UE-m), over which the HARQ feedback is monitored in block 605 of FIG. 6. This exemplary embodiment may be applicable for example for groupcast HARQ feedback option 2, wherein for example a sidelink RX UE transmits either ACK or NACK in its dedicated PSFCH resource, since different RX UEs may use different PSFCH resources. For example, in one option, UE-n may determine the PSFCH resource(s) and monitor the corresponding HARQ feedback(s) from the other RX UE(s) (for example UE-m) with group member ID(s) lower than UE-n, for example m<n. Alternatively or additionally, UE-n may determine a subset of RX UE(s) with group member ID(s) up to m, for example by detecting a configured number (such as k1) of (consecutive) ACK/NACK feedbacks from the PSFCH resources associated to group member ID m. The value of k1 may be configured by the network for example by using system information block (SIB) or radio resource control (RRC) signaling, or via UE implementation or (pre-)configuration. In addition, the value of k1 may be configured together/associated with the SL DRX configuration for the considered groupcast transmission. For example, UE-n may detect at least two consecutive HARQ feedbacks transmitted by UE-m before UE-n determines to monitor the PSFCH resources of the other RX UE group members with member IDs lower and/or equal to m.

In another exemplary embodiment, UE-n may select the subset of other RX UEs based on the other RX UEs from which it measures a signal quality metric, such as sidelink reference signal received power (RSRP) or received signal power or strength, of the detected HARQ feedback for example above a pre-defined threshold, for which it has higher confidence to be able to detect the HARQ feedback.

In another exemplary embodiment, if UE-n is aware of the group size of the considered groupcast, it may monitor the PSFCH resource(s) of all the other RX UE(s) in the group.

In another exemplary embodiment, wherein at least HARQ option 2 is used, UE-n may restart the sidelink DRX-InactivityTimer upon detecting ACK/NACK feedbacks over a pre-defined number (for example k2) of (consecutive) PSFCH resources from another RX UE, wherein the (consecutive) PSFCH resources are associated with the (consecutive) PSCCH/PSSCH transmissions over the indicated resources. The value of k2 may be configured by the network for example by using SIB or RRC signaling, or via UE implementation or (pre-)configuration. In addition, the value of k2 may be configured together/associated with the SL DRX configuration for the considered groupcast transmission. For example, UE-n may restart the timer if it detects two or more (consecutive) ACK/NACK feedbacks from another RX UE (for example UE-m), instead of restarting the timer based on just one detected feedback. Alternatively or additionally, UE-n may restart the timer upon detecting ACK/NACK feedbacks from a pre-defined number (for example k3) of RX UEs. For example, if UE-n determines to monitor the PSFCH resources of other RX UE group members with member IDs up to m, UE-n may restart its sidelink DRX-InactivityTimer if it has detected HARQ feedbacks from more than k3=⌊l×m⌋ RX UEs, where 0<l<1. The value for k3 and/or l may be configured by the network for example by using SIB or RRC signaling, or via UE implementation or (pre-)configuration. In addition, the value of k3 may be configured together/associated with the SL DRX configuration for the considered groupcast transmission. The value of k3 may also be (pre)configured according to the group size of the considered groupcast.

Figure 7:
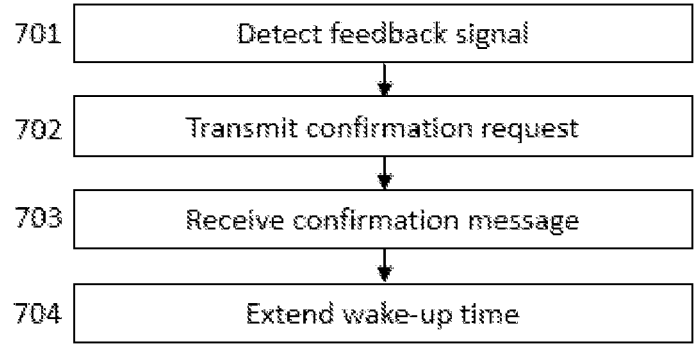

FIG. 7 illustrates a flow chart according to another exemplary embodiment. In this another exemplary embodiment, after UE-n detects a pre-defined number of ACK/NACK feedbacks from one or more of its peer sidelink RX UEs, for example UE-m, UE-n may send a request to UE-m, and UE-m may then further send a message back to UE-n in order to confirm that there is still ongoing data traffic for the considered sidelink groupcast. In this case, UE-n resets and restarts its sidelink DRX-InactivityTimer based on the received confirmation message. For example, the request message and/or the confirmation message may be carried, or indicated, by a medium access control control element (MAC CE), a radio resource control (RRC) message, an upper layer message, for example application layer, V2X or NAS layer, and/or by SCI. In case there is already an RRC connection between UE-n and UE-m, the messages may be unicasted between UE-n and UE-m. As another example, the request and/or confirmation message may be groupcasted to the considered group of RX UEs, wherein the message carries the request or confirmation, respectively, to/from UE-m as a payload. In this case, a PC5-RRC connection between UE-n and UE-m is not needed. Alternatively, the confirmation message may be a message or SCI addressed to the groupcast destination of the SCI received by UE-m from UE1, which has the effect to reset and restart the sidelink DRX-Inactivity Timer at UE-n.

Referring to FIG. 7, upon detecting 701 one or more feedback signals from a second UE, for example UE-m, a request message is transmitted 702 to the second UE, wherein the request message indicates a request to confirm if at least a part of the second transmission is received by the second UE over the indicated one or more resources. A confirmation message is received 703 from the second UE in response to the request message, wherein the confirmation message indicates that the at least part of the second transmission is received by the second UE over the indicated one or more resources. The wake-up time is extended 704 based at least partly on the received confirmation message. For example, the wake-up time extension may be triggered upon receiving the confirmation message. The wake-up time may be extended for example by resetting and restarting the sidelink DRX-InactivityTimer. The starting value of the reset sidelink DRX-InactivityTimer may take account of the time difference between the indicated resource and the time when the sidelink DRX-Inactivity Timer is reset based on the received confirmation message. On the other hand, if no confirmation message is received from the second UE, then the wake-up time is not extended.

The functions and/or blocks described above by means of FIG. 7 are in no absolute chronological order, and some of them may be performed simultaneously or in an order differing from the described one. Other functions and/or blocks may also be executed between them or within them.

In another exemplary embodiment, UE-n may extend the value of the sidelink DRX-InactivityTimer and/or the threshold value of the counter counting the number of consecutive unsuccessful receptions, once the radio conditions associated with UE1 deteriorate below a pre-defined threshold, for example if a measured signal quality metric, such as a signal-to-interference-plus-noise ratio (SINR) or RSRP, is below the pre-defined threshold, or the measured channel busy ratio (CBR) is above a pre-defined threshold, or according to a trend, for example if in a pre-defined number of past UE1 transmissions the measured delta, i.e. change, in the signal quality metric is below a pre-defined threshold. This allows UE-n to monitor the HARQ feedbacks from other RX UE group members for a longer period. The extended on-duration may be a function of the number of detected ACK/NACK feedbacks, for example k1 and/or k2. For example, if k1 and/or k2 is large, the extension of the sidelink DRX-Inactivity Timer may also be large such that it allows UE-n to detect the HARQ feedbacks to determine whether to reset and restart the sidelink DRX-InactivityTimer and/or the counter.

Figure 8:
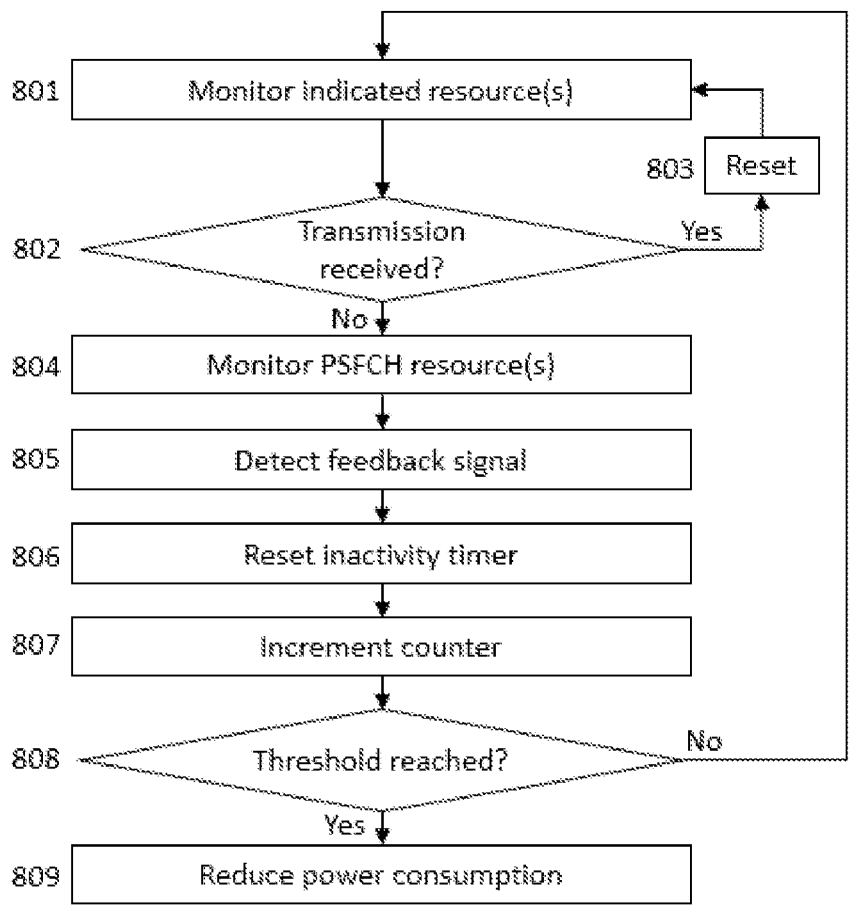

FIG. 8 illustrates a flow chart according to another exemplary embodiment. In this exemplary embodiment, UE-n may be configured with a counter indicating the maximum allowed number of consecutive reset/restart of the sidelink DRX-Inactivity Timer. Thus, if the deterioration of the radio conditions at UE-n is not temporary, then the counter can limit the maximum time that UE-n stays awake.

Referring to FIG. 8, the one or more resources indicated by UE1 are monitored 801. It is then checked 802, if a transmission is received over the indicated one or more resources. If transmission is received (802: yes), then UE-n resets 803 its inactivity timer and continues monitoring 801 the next one or more resources indicated for example in the received transmission, until the inactivity timer expires or a new transmission is received. If a transmission is not received (802: no), then the PSFCH resource(s) of the one or more other RX UE(s) are monitored 804. One or more feedback signals from the one or more other RX UEs is detected 805 over the monitored PSFCH resource(s). The inactivity timer is reset 806, and a counter is incremented 807. It is then checked 808, whether the incremented counter has reached a pre-defined threshold value. If the incremented counter reaches the pre-defined threshold value (808: yes), then power consumption is reduced 809, i.e. UE-n enters sleep mode. On the other hand, if the incremented counter does not reach the pre-defined threshold value (808: no), then UE-n stays awake and continues monitoring 801 the indicated resource(s) until the threshold is reached or the inactivity timer expires as a result of not detecting new transmissions or feedback signals.

The functions and/or blocks described above by means of FIG. 8 are in no absolute chronological order, and some of them may be performed simultaneously or in an order differing from the described one. Other functions and/or blocks may also be executed between them or within them.

According to the current logical channel prioritization (LCP) behavior, UE1 may use the resource(s) indicated for example by the first transmission for transmitting other data with a higher priority than the groupcast data. In this case, the groupcast data may take place in an un-indicated resource, which means that UE-n cannot derive the PSFCH resource of other RX UEs since UE-n does not know which resource UE1 will use for the groupcast. Therefore, in some exemplary embodiments, the LCP behavior may be altered such that UE1 is forced to transmit the groupcast data in the indicated resource, such that the time difference between two consecutive groupcast transmissions over two indicated resources is smaller than the configured value of the inactivity timer. This may ensure that UE-n resets and restarts its sidelink DRX-InactivityTimer based on the HARQ feedbacks from the other RX UE(s) before its sidelink DRX-InactivityTimer expires. For example, UE1 may first transmit a first transmission to one or more second UEs (for example UE-n and UE-m), wherein the first transmission indicates one or more resources for transmitting at least a second transmission from UE1. UE1 then transmits the second transmission to the one or more second UEs over the indicated one or more resources, wherein a time difference between the first transmission and the second transmission is smaller than the value of the inactivity timer used by the one or more second UEs, and/or the number of skipped transmissions between the first transmission and the second transmission over the indicated one or more resources is smaller than a threshold value of a counter used by the one or more second UEs.

Figure 9:
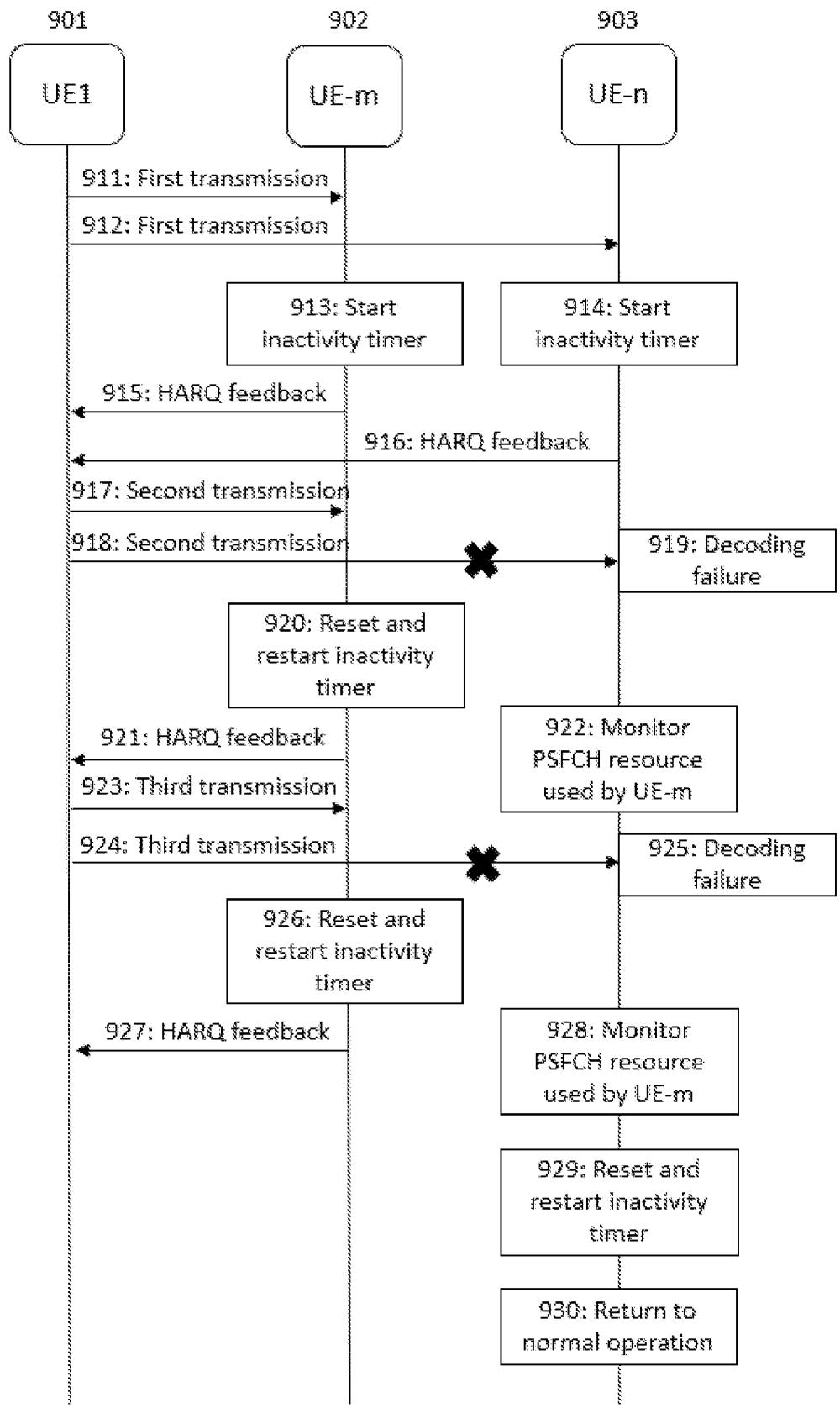
FIG. 9 illustrates a signalling diagram according to an exemplary embodiment.

FIG. 9 illustrates a signalling diagram according to an exemplary embodiment, wherein UE-n monitors multiple HARQ feedbacks via multiple PSFCH resources of a sidelink groupcast RX UE (for example UE-m), in order to determine if the sidelink DRX-InactivityTimer should be reset and restarted. The multiple HARQ feedbacks are associated with the PSCCH/PSSCH transmissions via multiple indicated/reserved resources.

Referring to FIG. 9, a first UE 901 (denoted as UE1), i.e. a sidelink groupcast TX UE, transmits 911, 912, or groupcasts, a first transmission, for example comprising a first set of SCI and/or data, to a second UE 902 (denoted as UE-m) and to a third UE 903 (denoted as UE-n), wherein UE-m and UE-n are sidelink groupcast RX UEs. The abbreviations m and n may refer to the group member IDs of the two RX UEs used in the considered groupcast, for example if HARQ option 2 is used. The first transmission indicates the future PSCCH and/or PSSCH resource(s) reserved by UE1 for the considered sidelink groupcast. Thus, the first transmission enables UE-m and UE-n to derive the corresponding PSFCH resource(s) for both UE-m and UE-n for future groupcast transmission(s) over the reserved PSCCH and/or PSSCH resource(s). Furthermore, the first transmission may indicate the use of sidelink HARQ option 1 or option 2 for the groupcast RX UEs to send their HARQ feedbacks over the shared or dedicated PSFCH resource(s). It should be noted that the number of RX UEs may vary from what is shown in FIG. 9. For example, there may be more than two RX UEs in the group.

UE-m (re)sets and (re)starts 913 its sidelink DRX-Inactivity Timer based on the received first transmission. UE-n also (re)sets and (re)starts 914 its sidelink DRX-Inactivity Timer based on the received first transmission. UE-m transmits 915 HARQ feedback, such as an ACK or NACK, to UE1, and UE-n also transmits 916 HARQ feedback, such as an ACK or NACK, to UE1.

UE1 transmits 917 a second transmission, for example comprising a second set of SCI, to UE-m over the resource(s) indicated by the first transmission. UE1 also transmits 918 the second transmission to UE-n over the indicated resource(s), but UE-n fails 919 to receive and decode at least a part of the second transmission, for example due to poor radio conditions.

UE-m resets and restarts 920 its sidelink DRX-Inactivity Timer based on the received second transmission, and transmits 921 HARQ feedback to UE1. UE-n monitors 922 the PSFCH resource(s) used by UE-m and/or one or more other groupcast RX UEs, and detects the HARQ feedback transmission 921 from UE-m.

UE1 transmits 923 a third transmission, for example comprising a third set of SCI, to UE-m over the resource(s) indicated by the first transmission and/or the second transmission(s). UE1 also transmits 924 the third transmission to UE-n over the indicated resource(s), but UE-n fails 925 to receive and decode at least a part of the third transmission for example due to poor radio conditions.

UE-m resets and restarts 926 its sidelink DRX-Inactivity Timer based on the received third transmission, and transmits 927 HARQ feedback to UE1. UE-n monitors 928 the PSFCH resource(s) used by UE-m and/or one or more other groupcast RX UEs, and detects the HARQ feedback transmission 927 from UE-m.

UE-n then determines to reset and restart 929 its sidelink DRX-InactivityTimer based on the number of detected HARQ feedbacks, i.e. based on detecting two HARQ feedbacks from UE-m in this example.

UE-n may return 930 to its normal baseline operation once the transmission, for example an SCI including a $1^{st}$ stage SCI and/or $2^{nd}$ stage SCI, transmitted from UE1 to UE-n is decodable by UE-n again, for example when the radio conditions improve. In the normal baseline operation, UE-n resets and restarts its sidelink DRX-InactivityTimer if an SCI associated with the considered groupcast is received from UE1, i.e. without having to resort to the HARQ feedback monitoring of other RX UE(s).

The functions and/or blocks described above by means of FIG. 9 are in no absolute chronological order, and some of them may be performed simultaneously or in an order differing from the described one. Other functions and/or blocks may also be executed between them or within them.

Figure 10:
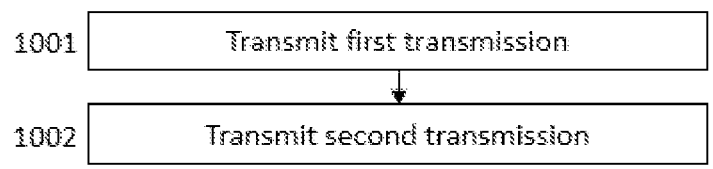
FIG. 10 illustrates a flow chart according to an exemplary embodiment.

FIG. 10 illustrates a flow chart according to another exemplary embodiment. The functions illustrated in FIG. 10 may be performed by a first UE. A first transmission is transmitted 1001 to one or more second UEs and to a third UE, wherein the first transmission indicates one or more resources reserved at least for a second transmission from the first UE. The second transmission is transmitted 1002 to the one or more second UEs and to the third UE over the indicated one or more resources. The time difference between the first transmission and the second transmission may be smaller than the value of an inactivity timer used by the third UE and/or the one or more second UEs. Alternatively or additionally, the number of skipped transmissions between the first transmission and the second transmission over the indicated one or more resources may be smaller than the threshold value of a counter used by the third UE and/or the one or more second UEs.

A technical advantage provided by some exemplary embodiments is that communication reliability in sidelink may be improved by preventing a UE from going to sleep mode by mistake and thus accidentally missing data transmissions.

Figure 11:
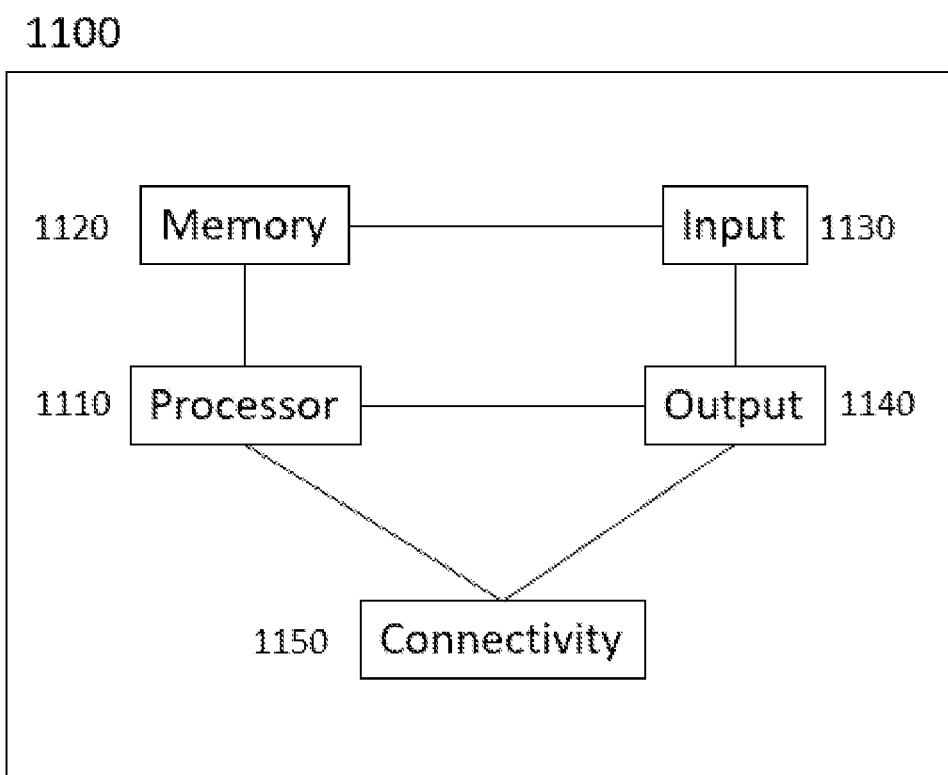
FIG. 11 illustrates an apparatus according to an exemplary embodiment.

FIG. 11 illustrates an apparatus 1100, which may be an apparatus such as, or comprised in, a terminal device, according to an exemplary embodiment. A terminal device may also be referred to as a UE herein. The apparatus 1100 comprises a processor 1110. The processor 1110 interprets computer program instructions and processes data. The processor 1110 may comprise one or more programmable processors. The processor 1110 may comprise programmable hardware with embedded firmware and may, alternatively or additionally, comprise one or more application specific integrated circuits, ASICs.

The processor 1110 is coupled to a memory 1120. The processor is configured to read and write data to and from the memory 1120. The memory 1120 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1120 stores computer readable instructions that are executed by the processor 1110. For example, non-volatile memory stores the computer readable instructions and the processor 1110 executes the instructions using volatile memory for temporary storage of data and/or instructions.

The computer readable instructions may have been pre-stored to the memory 1120 or, alternatively or additionally, they may be received, by the apparatus, via an electromagnetic carrier signal and/or may be copied from a physical entity such as a computer program product. Execution of the computer readable instructions causes the apparatus 1100 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1100 may further comprise, or be connected to, an input unit 1130. The input unit 1130 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1130 may comprise an interface to which external devices may connect to.

The apparatus 1100 may also comprise an output unit 1140. The output unit may comprise or be connected to one or more displays capable of rendering visual content such as a light emitting diode, LED, display, a liquid crystal display, LCD and a liquid crystal on silicon, LCoS, display. The output unit 1140 may further comprise one or more audio outputs. The one or more audio outputs may be for example loudspeakers.

The apparatus 1100 further comprises a connectivity unit 1150. The connectivity unit 1150 enables wireless connectivity to one or more external devices. The connectivity unit 1150 comprises at least one transmitter and at least one receiver that may be integrated to the apparatus 1100 or that the apparatus 1100 may be connected to. The at least one transmitter comprises at least one transmission antenna, and the at least one receiver comprises at least one receiving antenna. The connectivity unit 1150 may comprise an integrated circuit or a set of integrated circuits that provide the wireless communication capability for the apparatus 1100. Alternatively, the wireless connectivity may be a hardwired application specific integrated circuit, ASIC. The connectivity unit 1150 may comprise one or more components such as a power amplifier, digital front end, DFE, analog-to-digital converter, ADC, digital-to-analog converter, DAC, frequency converter, (de)modulator, and/or encoder/decoder circuitries, controlled by the corresponding controlling units.

It is to be noted that the apparatus 1100 may further comprise various components not illustrated in FIG. 11. The various components may be hardware components and/or software components.

As used in this application, the term "circuitry" may refer to one or more or all of the following:
  a. hardware-only circuit implementations (such as implementations in only analog and/or digital circuitry) and
  b. combinations of hardware circuits and software, such as (as applicable):
    i. a combination of analog and/or digital hardware circuit(s) with software/firmware and
    ii. any portions of hardware processor(s) with software (including digital signal processor(s)), software, and memory(ies) that work together to cause an apparatus, such as a mobile phone, to perform various functions) and
  c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory storing instructions that, when executed by the at least one processor, to cause the apparatus to:
   receive a first transmission from a first terminal device, wherein the first transmission indicates one or more resources to be used at least for a second transmission to the apparatus;
   monitor one or more physical feedback channel resources associated with the indicated one or more resources;
   detect one or more feedback signals from the monitored one or more physical feedback channel resources; and
   extend a wake-up time of the apparatus based at least partly on the detected one or more feedback signals,
   wherein the wake-up time is extended at least by resetting an inactivity timer based at least partly on the detected one or more feedback signals;
   wherein the inactivity timer indicates reducing power consumption of the apparatus upon expiration of the inactivity timer,
   wherein the apparatus is further caused to:
   increment a first counter upon resetting the inactivity timer; and
   reduce power consumption, if the incremented first counter reaches a first pre-defined threshold value.

2. An apparatus according to claim 1, wherein the wake-up time is extended at least by resetting a second counter based at least partly on the detected one or more feedback signals;
   wherein the second counter indicates a number of consecutive unsuccessful receptions of transmissions over the indicated one or more resources; and
   wherein the apparatus reduces power consumption for a pre-defined time period, if the second counter has a value equal to or larger than a second pre-defined threshold value.

3. An apparatus according to claim 1, wherein at least one of the following: a value of the inactivity timer and/or the second pre-defined threshold value is extended, if a measured signal quality metric or a signal quality trend for the first transmission is below a third pre-defined threshold value.

4. An apparatus according to claim 1, wherein the wake-up time is extended upon detecting a pre-defined number of feedback signals.

5. An apparatus according to claim 1, wherein the apparatus is further caused to:
   determine the one or more physical feedback channel resources based at least partly on the received first transmission.

6. An apparatus according to claim 1, wherein the one or more feedback signals are from a plurality of second terminal devices, and the one or more feedback signals indicate receiving at least a part of the second transmission by the plurality of second terminal devices.

7. An apparatus according to claim 1, wherein the one or more physical feedback channel resources are monitored, if at most a part of the second transmission is received over the indicated one or more resources.

8. An apparatus according to claim 1, wherein the apparatus is further caused to:
   transmit, upon detecting the one or more feedback signals, a request message to a second terminal device, wherein the request message indicates a request to confirm if at least a part of the second transmission is received by the second terminal device over the indicated one or more resources; and
   receive a confirmation message from the second terminal device in response to the request message, wherein the confirmation message indicates that the at least part of the second transmission is received by the second terminal device over the indicated one or more resources;
   wherein the wake-up time is extended based at least partly on the received confirmation message.

9. An apparatus according to claim 1, wherein the one or more feedback signals comprise at least one of the following: a hybrid automatic repeat request acknowledgement and/or a hybrid automatic repeat request non-acknowledgement.

10. An apparatus according to claim 1, wherein the apparatus is comprised in a third terminal device.

11. A method comprising:
    receiving a first transmission from a first terminal device, wherein the first transmission indicates one or more resources to be used at least for a second transmission;
    monitoring one or more physical feedback channel resources associated with the indicated one or more resources;

detecting one or more feedback signals from the monitored one or more physical feedback channel resources; and extending a wake-up time based at least partly on the detected one or more feedback signals, wherein the wake-up time is extended at least by resetting an inactivity timer based at least partly on the detected one or more feedback signals;

wherein the inactivity timer indicates reducing power consumption of the apparatus upon expiration of the inactivity timer, wherein the method further comprises:

incrementing a first counter upon resetting the inactivity timer; and reducing power consumption, if the incremented first counter reaches a first pre-defined threshold value.

12. A non-transitory computer readable medium comprising program instructions that, when executed by an apparatus, cause the apparatus to perform at least the following:

receive a first transmission from a first terminal device, wherein the first transmission indicates one or more resources to be used at least for a second transmission to the apparatus;

monitor one or more physical feedback channel resources associated with the indicated one or more resources;

detect one or more feedback signals from the monitored one or more physical feedback channel resources; and extend a wake-up time of the apparatus based at least partly on the detected one or more feedback signals, wherein the wake-up time is extended at least by resetting an inactivity timer based at least partly on the detected one or more feedback signals;

wherein the inactivity timer indicates reducing power consumption of the apparatus upon expiration of the inactivity timer, wherein the apparatus is further caused to:

increment a first counter upon resetting the inactivity timer; and reduce power consumption, if the incremented first counter reaches a first pre-defined threshold value.

13. A method according to claim 11, wherein the wake-up time is extended at least by resetting a second counter based at least partly on the detected one or more feedback signals;

wherein the second counter indicates a number of consecutive unsuccessful receptions of transmissions over the indicated one or more resources; and wherein the apparatus reduces power consumption for a pre-defined time period, if the second counter has a value equal to or larger than a second pre-defined threshold value.

14. A method according to claim 12, wherein at least one of the following: a value of the inactivity timer or the second pre-defined threshold value is extended, if a measured signal quality metric or a signal quality trend for the first transmission is below a third pre-defined threshold value.

15. A method according to claim 11, wherein the wake-up time is extended upon detecting a pre-defined number of feedback signals.

16. A method according to claim 11, wherein the method further comprises:

determining the one or more physical feedback channel resources based at least partly on the received first transmission.

* * * * *